(12) United States Patent
Zhang et al.

(10) Patent No.: US 12,724,824 B2
(45) Date of Patent: Sep. 1, 2026

(54) ENERGY-EFFICIENT HARDWARE-SOFTWARE COLLABORATIVE METHOD AND APPARATUS FOR GRAPH PROCESSING

(71) Applicant: Huazhong University Of Science And Technology, Wuhan City (CN)

(72) Inventors: Yu Zhang, Wuhan City (CN); Jin Zhao, Wuhan City (CN); Qiange Shen, Wuhan City (CN); Xinyu Jiang, Wuhan City (CN); Hui Yu, Wuhan City (CN); Hao Qi, Wuhan City (CN); Yun Yang, Wuhan City (CN); Shijun Li, Wuhan City (CN); Xiaofei Liao, Wuhan City (CN); Hai Jin, Wuhan City (CN)

(73) Assignee: Huazhong University of Science and Technology, Wuhan City (CN)

( * ) Notice: Subject to any disclaimer, the term of this patent is extended or adjusted under 35 U.S.C. 154(b) by 1022 days.

(21) Appl. No.: 17/945,792

(22) Filed: Sep. 15, 2022

(65) Prior Publication Data

US 2023/0367815 A1 Nov. 16, 2023

(51) Int. Cl.
*G06F 16/901* (2019.01)
*G06F 8/41* (2018.01)
*G06F 9/50* (2006.01)

(52) U.S. Cl.
CPC .......... *G06F 16/9024* (2019.01); *G06F 8/433* (2013.01); *G06F 9/5066* (2013.01)

(58) Field of Classification Search
CPC .... G06F 16/9024; G06F 8/433; G06F 9/5066; Y02D 10/00
See application file for complete search history.

(56) References Cited

U.S. PATENT DOCUMENTS

2021/0397557 A1* 12/2021 Lee .................... G06F 12/0811

OTHER PUBLICATIONS

Annavaram et al., "Data Prefetching by Dependency Graph Precomputation" (May 1, 2001) ACM SIGARCH Computer Architecture News, vol. 29, Issue 2, pp. 52-61 [retrieved from https://dl.acm.org/doi/pdf/10.1145/384285.379251]. (Year: 2001).*

(Continued)

*Primary Examiner* — Brian W Wathen
(74) *Attorney, Agent, or Firm* — Smart & Biggar LP

(57) ABSTRACT

The present invention relates to energy-efficient collaborative method and apparatus for graph processing, wherein the apparatus comprises at least: a dependency path prefetching unit for receiving active vertex information and prefetching an edge of graph partition along a dependency path, starting with an active vertex in a circular queue; and a direct dependency managing unit for converting dependency relationship between head and tail vertices of a core dependency path into direct dependency and managing it in a cache, and updating dependency indexes according to dynamic changes in graph structure during dynamic graph processing, so as to ensure accurate results of graph processing. The accelerator of the present invention is capable of being integrated into a multi-core processor, thereby processing multiple paths on multiple processor kernels with high concurrency, and in turn accelerating dissemination of vertex states in a graph to speed convergence during graph processing.

18 Claims, 5 Drawing Sheets

(56) References Cited

OTHER PUBLICATIONS

Zhang et al., "DepGraph: A Dependency-Driven Accelerator for Efficient Iterative Graph Processing" (Apr. 22, 2021), 2021 IEEE International Symposium on High-Performance Computer Architecture, pp. 371-384 [retrieved from https://ieeexplore.ieee.org/stamp/stamp.jsp?tp=&arnumber=9407071]. (Year: 2021).*

Zhou et al., "HitGraph: High-throughput Graph Processing Framework on FPGA" (Apr. 11, 2019) IEEE Transactions on Parallel and Distributed Systems, vol. 30, Issue 10, pp. 2249-2264 [retrieved from https://ieeexplore.ieee.org/stamp/stamp.jsp?tp=&arnumber=8685122]. (Year: 2019).*

Zhang et al., "DiGraph: An Efficient Path-based Iterative Directed Graph Processing System on Multiple GPUs" (Apr. 2019), ASPLOS'19, pp. 601-614 [retrieve from https://dl.acm.org/doi/pdf/10.1145/3297858.3304029]. (Year: 2019).*

* cited by examiner

ENERGY-EFFICIENT HARDWARE-SOFTWARE COLLABORATIVE METHOD AND APPARATUS FOR GRAPH PROCESSING

BACKGROUND OF THE INVENTION

Technical Field

The present invention relates to the technical field of graph processing, and more particularly to energy-efficient hardware-software collaborative method and apparatus for graph processing.

Description of Related Art

With the advent of the era of big data, graphs, as a data structure well presenting data association, have been extensively used in various areas such as Internet applications, data mining, scientific computing. Currently, many major graph applications, such as path analysis, product recommendation, and social-network analysis, employ iterative graph algorithms to process graph data iteratively until convergence.

In an iterative graph algorithm, state updating of a vertex in a graph depends on the state value of its neighbor vertices. Such dependency existing in a graph structure leads to relatively long dependency chains among graph vertices. The latest state of a vertex can only reach its indirect neighbor after multiple rounds of dissemination along the dependency path. Dissemination of vertex states along dependency paths among multiple processor kernels means high synchronization overheads. Many vertices stay inactive before their neighbors' latest states are informed to them. Additionally, a graph vertex's neighbor can access to outdated state value of vertex which leads to unnecessary state updating. Therefore, multi-core processors can usually perform efficient update of iterative graph algorithms on graph data with inferior parallelism, and this significantly degrades graph processing in terms of efficiency.

In order to provide more real-time results for graph applications, some software- and hardware-based solutions have been proposed to speed graph processing on multi-core processors. However, without considering dependency relationship among vertices, these known solutions leave the problem of insufficient use of multi-core processors unaddressed and fail to achieve efficient dissemination of vertex states in the topological structure of a graph, thereby leading to slow convergence in iterative graph algorithms. Additionally, graphs applied in the real world are usually dynamic. For example, social relations and flight information are always changing. Such rapid changes in graph topological structure can make graph processing lose its timeliness fast. For this reason, graph applications are more demanding for real-time results of dynamic graph processing. While the existing solutions may be usable for static graph processing, they are usually incapable of dealing with dynamic changes in graph structure.

For example, China Patent No. CN109919826A discloses a diagram data compression method and a graph processing accelerator. The method includes: S1. having pre-processing circuit of a graph processing accelerator convert to-be-processed graph data that are represented by adjacent sparse matrixes into graph data in the format of compressed sparse column independently, CSCI, wherein every independently compressed column of graph data includes a column label data pair and a non-zero element data pair, and every data pair includes an index and a numerical value, in which the top two digits of the index indicate the meanings of the other digits of the index and the numerical value; and S2. having the pre-processing circuit of the graph processing accelerator store the graph data in the CSCI format in to the memory of the graph processing accelerator. The prior-art compression method is focused on improvements in parallelism and energy efficiency of graph processing accelerators, and also fails to take graph vertices into consideration.

In addition, on one hand, due to the differences in the understanding of those skilled in the art; on the other hand, due to the fact that the applicant studied a large amount of literature and patents when putting the invention, but space limitations do not allow all the details and content are described in detail, however, this does not mean that the invention does not have these prior art features, on the contrary, the present invention already has all the features of the prior art, and the applicant reserves the right to add relevant prior art to the background technology.

SUMMARY OF THE INVENTION

The problems of the existing technical schemes include failing to consider dependency relationship among vertices, leaving multi-core processors used insufficiently, disseminating vertex states inefficiently in the topological structure of graphs, and consequently leading to slow convergence in iterative graph algorithms. Additionally, graphs applied in the real world are usually dynamic. For example, social relations and flight information are always changing. Such rapid changes in graph topological structure can make graph processing lose its timeliness fast. For this reason, graph applications are more demanding for real-time results of dynamic graph processing. While the existing solutions may be usable for static graph processing, they are usually incapable of dealing with dynamic changes in graph structure.

In order to address the shortcomings of the prior art, the present invention provides an energy-efficient collaborative graph processing method and an apparatus thereof, which overcome the problems of iterative graph processing on multi-core processors about poor parallelism, slow dissemination of graph vertex states, and inefficient graph processing, so as to process both static graphs and dynamic graphs efficiently.

Preferably, the present invention provides an energy-efficient collaborative apparatus for graph processing, comprising: a dependency path prefetching unit for receiving active vertex information and prefetching an edge of graph partition along a dependency path, starting with an active vertex in a circular queue; and a direct dependency managing unit for converting dependency relationship between head and tail vertices of a core dependency path into direct dependency.

Preferably, the direct dependency managing unit is further such configured that after the state of the head state of the path is updated, parameters for a direct dependency equation are provided to the processor kernel, so as to enable the processor kernel to use the direct dependency equation to figure out the influence on the tail vertex of the path and update the state of the tail vertex accordingly.

Preferably, the direct dependency managing unit is further for: during dynamic graph processing, acquiring an invalid dependency index based on changes in a graph structure, and delete the invalid dependency index so as to achieve updating of dependency indexes.

Preferably, the dependency path prefetching unit prefetches, starting with the active vertex, the edge of the graph partition along the dependency path at least through: with an accelerator initialized, prefetching the edge by means of a 4-stage pipeline, and outputting the identified edge and a state of a pair of vertices corresponding to the edge to a FIFO edge buffer area for a processor kernel to access and process.

Preferably, the dependency path prefetching unit prefetches the edge by means of the 4-stage pipeline at least through:

acquiring a vertex from active vertex queue, and pushing it into the empty stack;

acquiring start/end offsets of an outgoing edge of a stack top vertex from an offset array;

according to edges not accessed of the stack top vertex, identifying IDs of neighbor vertices not accessed, and pushing one of the neighbor vertices into the stack; and outputting the edge and the values of two vertices corresponding to the edge to First-Input-First-Output buffer area; and if the stack top vertex is in a vertex set $H^m$, popping the stack top vertex from the stack, and inserting it to the circular queue as a new active vertex; or if there is not any un-accessed vertices in the graph partition $G^m$ identified from the neighbor vertices of the stack top vertex, popping the stack top vertex from the stack.

Preferably, the direct dependency managing unit converts the dependency relationship between head vertex and tail vertex of a core dependency path into the direct dependency using an equation at least as:

$$s_i = f_{(v_j,v_i)}(s_j) = \mu \cdot s_j + \xi,$$

where $s_j$ and $s_i$ are state values of the vertices j, i, and μ, ξ denote constant parameters.

Preferably, the direct dependency managing unit converts the dependency relationship between head vertex and tail vertex of a core dependency path into the direct dependency at least through:

after first processing of the core dependency path l, storing serial numbers j, i and first state values $s_j$, $s_i$ of its head and tail vertices to a direct dependency index array, and setting an index flag as I, wherein the core dependency path l is a path having its head and tail vertices both in the vertex set $H^m$;

after second processing of the core dependency path l, acquiring state values $$s'_j, s'_i$$

of the head and tail vertices, and substituting the second state values $$s'_j, s'_i$$

and the first state values $s_j$, $s_i$ into the equation of direct dependency to calculate values of the constant parameters μ, ξ, and storing the values of the constant parameters μ, ξ into the direct dependency index array, and setting the index flag as A.

Preferably, the direct dependency managing unit establishes the mapping relationship between the vertex ID and the address of the direct dependency index through the in-memory hash table. During conversion of the dependency relationship, the direct dependency managing unit makes insertion or updating to the in-memory hash table according to the generated direct dependency index, wherein, when the vertex ID corresponding to the direct dependency index is not inserted into the in-memory hash table, the direct dependency managing unit inserts the table entry <ID, start_offset, end_offset, weight> into the in-memory hash table, in which the weight is set as the number of hash collisions N+1; and when the vertex ID corresponding to the direct dependency index has been inserted into the in-memory hash table, the direct dependency managing unit updates the start offset start_offset, the end offset end_offset and the weight of the table entry, in which the weight value is updated into weight+1.

Preferably, the apparatus further comprises an on-chip cache unit, in which the on-chip cache unit is in data connection with the direct dependency managing unit, the direct dependency managing unit establishes a cache hash table in the on-chip cache unit, wherein, the direct dependency managing unit caches frequently accessed table entries and table entries with collision of the in-memory hash table into the on-chip cache unit according to a custom insertion strategy and/or replacement strategy.

Preferably, when the head vertex of the path is prefetched, the direct dependency managing unit searches a corresponding dependency index by the vertex IDs at least through: acquiring a storage address of a target dependency index from the on-chip cache unit, and if acquisition fails, acquiring a storage address of the target dependency index from the in-memory hash table; and according to the storage address of the target dependency index, acquiring direct dependency index information corresponding to vertices from the direct dependency index array.

Preferably, during the process of dynamic graph processing, the direct dependency managing unit updates the dependency indexes at least through:

traversing graph structure updating information, and acquiring a deleted edge <s, d>;

performing depth-first-search traversal in a core subgraph starting from a target vertex d of the deleted edge, and setting a maximum traversal depth, adding core vertices accessed during the traversal into the vertex set $H^d$, and transferring the vertex set $H^d$ to the direct dependency managing unit after the traversal for index updating;

performing traversal to identify the direct dependency index whose tail vertex has a serial number in the vertex set $H^d$, and if the head vertex of the dependency index is not in the vertex set $H^d$, deleting the dependency index, or if the head vertex of the dependency index is in the vertex set $H^d$, retaining the dependency index; and updating the core subgraph synchronously by deleting the corresponding edge from the core subgraph, and adding a source vertex and a target vertex of the deleted edge to the core vertex set $H^m$.

The present invention further provides an energy-efficient collaborative method for graph processing by the energy-efficient collaborative apparatus for graph processing, comprising at least:

receiving active vertex information and prefetching an edge of graph partition along a dependency path, starting with an active vertex in a circular queue; and converting dependency relationship between head and tail vertices of a core dependency path into direct dependency; and/or updating dependency indexes according to dynamic changes in graph structure during dynamic graph processing.

DETAILED DESCRIPTION OF THE INVENTION

The present invention will be further detailed below with reference to accompanying drawings.

The present invention provides energy-efficient collaborative method and apparatus for graph processing. The present invention can also provide a processor capable of running the graph computing processing of the present invention. The present invention can also provide a storage medium that stores a running code of the graph processing of the present invention.

In the present invention, a cache unit refers to a storage device capable of efficient data exchange. The cache unit may be a RAM (Random-Access Memory), a ROM (Read-Only Memory), or a memory mapped register.

Figure 1:
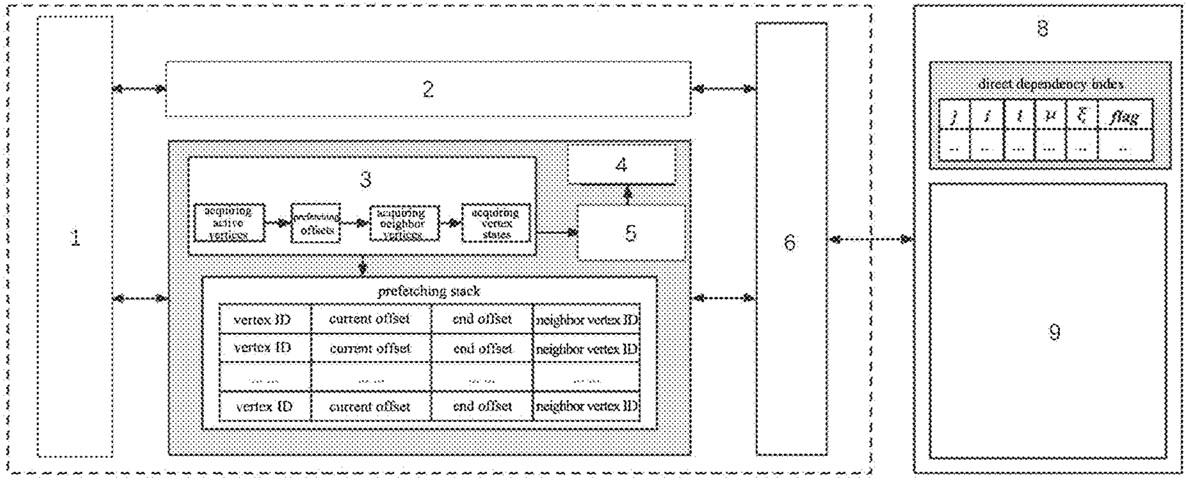
FIG. 1 is a schematic drawing showing the hardware structure of an accelerator according to one preferred embodiment of the present invention.

The energy-efficient collaborative apparatus for graph processing of the present invention as shown in FIG. 1 may be also referred to as a graph processing accelerator.

The graph processing accelerator establishes communicative connection through at least one second cache unit 6 and at least one third cache unit 8 for transmitting data information.

As shown in FIG. 1, the graph processing accelerator at least comprises a dependency path prefetching unit 3 and a direct dependency managing unit 5. The dependency path prefetching unit 3 and the direct dependency managing unit 5 are of relationship of data transmission.

For example, the dependency path prefetching unit 3 may be a sub-processor, an application-specific integrated chip, or a server that can prefetch dependency paths. For example, a sub-processor can run an encoding program of a dependency path prefetching method.

The direct dependency managing unit 5 may be a sub-processor, an application-specific integrated chip, or a server that can perform direct dependency managing. For example, the sub-processor can run an encoding program of a direct dependency managing method.

The graph processing accelerator may be integrated as a processor, an application-specific integrated chip, or a server that can perform dependency path prefetching, direct dependency managing and/or on-chip caching. Preferably, the graph processing accelerator is integrated in a multi-core processor.

Preferably, the graph processing accelerator may alternatively be composed of at least two sub-processors that are connected to each other. For example, the dependency path prefetching unit 3 and the direct dependency managing unit 5 are in connection, which allows data transmission and data processing. Every accelerator is bind to a muti-core processor's core.

Preferably, graph processing accelerator is coupled to a processor kernel 1, as shown in FIG. 1. The first cache unit 2 is in connection of data transmission with the processor kernel 1 and the second cache unit 6, respectively. The graph processing accelerator is in connection of data transmission with the processor kernel 1 and the second cache unit 6, respectively. The second cache unit 6 is in communicative connection with a third cache unit 8. The first cache unit 2 and the graph processing accelerator are connected in parallel.

The dependency path prefetching unit 3 is such configured that it prefetches edges to be processed along a dependency path starting with an active vertex.

The direct dependency managing unit 5 is such configured that it converts the dependency relationship between head vertex and tail vertex of a core dependency path into direct dependency and performs cache managing thereon.

A few graph vertices connect most edges in a graph because of the power law property of graphs, and state dissemination among the majority of the graph vertices relies on the core dependency path. The key concept of the present invention is to convert indirect dependency between head and tail vertices of a core dependency path into direct dependency, thereby parallelizing asynchronous dissemination of vertex states in the dependency path and accelerating the iteration graph algorithm for convergence.

The direct dependency managing unit 5 may be further configured to update the dependency index during dynamic graph processing according to changes in graph structure.

The energy-efficient collaborative graph processing method and the apparatus for graph processing of the present invention perform graph processing based on the principle that, in each iteration, the graph processing accelerator coupled to the processor kernel 1 prefetches graph data 9 along the dependency path for the processor kernel 1 to access and process, so that the graph vertex's value is able to be efficiently disseminated on the dependency path. Meanwhile, the graph processing accelerator also maintains a set of direct dependency relationship between head vertex and tail vertex of a core dependency path, thereby further accelerating dissemination of vertex states, and maximizing parallelism of the multi-core processor.

In the present invention, a path that partitions a core subgraph at paths whose intersections are head vertex or tail vertex is called a core path. A core vertex refers to a vertex having an intersection of two core paths.

Figure 2:
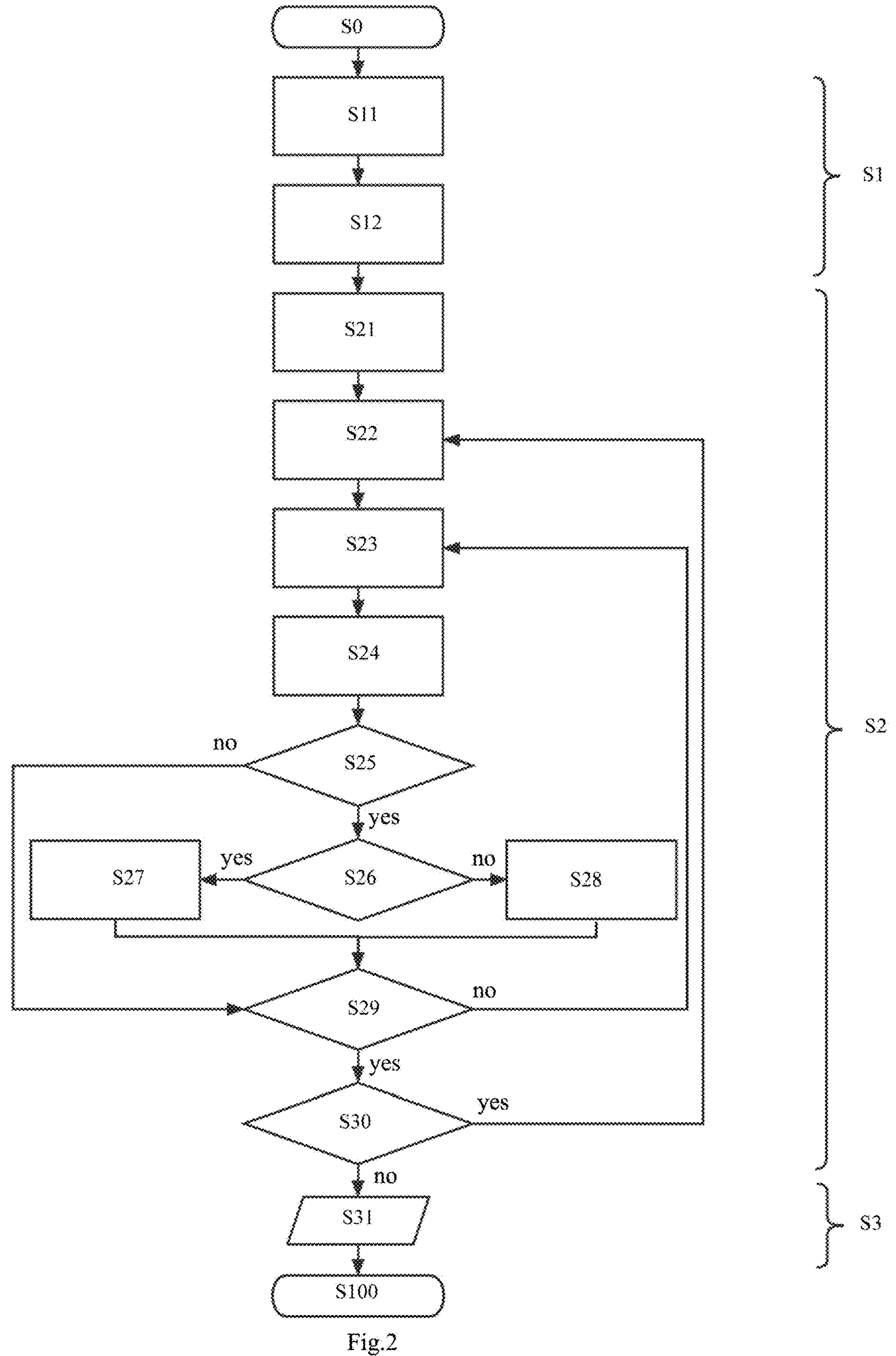
FIG. 2 is a flowchart of a graph processing method according to one preferred embodiment of the present invention.

As shown in FIG. 2, the graph processing method of the disclosed graph processing accelerator at least comprises steps S1-S3. Preferably, the graph algorithm of the present invention at least has the following two attributes.

The first attribute is that the graph algorithm can be represented through a Gather-Apply-Scatter (GAS) model.

The second attribute is that the edge processing function of the graph algorithm is a linear expression, which is usually represented using multiplication or addition.

Most iteration graph algorithms can satisfy the two attributes, such as pagerank, adsorption, SSSP, WCC, k-core, etc., and the SSSP algorithm is described as an example for illustrating the following processing of the present invention.

S1: Pre-Processing Stage.

Traversal is performed on vertices of a graph, and vertices having a degree greater than a degree threshold T are defined as central vertices. Then, graph data are traversed based on the central vertices so that central paths, namely paths whose head and tail vertices are both central vertices, are identified, thereby obtaining a core subgraph formed as a union of the central paths. The core subgraph is then traversed and partitioned into core paths whose meeting vertices are path head and tail vertices. At the same time, vertices that are intersections of at two core paths are identified as core vertices. After completing pre-processing of the graph data, the processor kernel calls the configuration interface of the accelerator to transmit the graph data information to an accelerator-accessible register to initialize the accelerator. Herein, the memory mapped register is a part of the accelerator.

S2: Graph Processing Stage.

In every iteration of graph processing, the dependency path prefetching unit 3 of the accelerator dynamically prefetches edges of graph partitions corresponding to its processor kernel by means of depth-first-search, starting with an active vertex. While the dependency path prefetching unit 3 performs edge prefetching, the direct dependency managing unit 5 converts the indirect dependency between head vertex and tail vertex of a core dependency path into direct dependency and performs cache management thereon. In the SSSP algorithm, the direct dependency relationship between two vertices can be represented by the equation: $s_i=f(v_j,v_i)(s_j)=\mu\cdot s_j+\xi$, where $s_j$, $s_j$ are the state values of the vertices j,i, and $\mu$, $\xi$ are constant parameters. (In an SSSP algorithm, the parameter $\mu$ is always 1).

In the process of processing the core dependency path I for the first time, first state values ($s_j$, $s_i$) of the first set of vertices of the head and tail vertices of the are stored. In the process of processing the path l for the second time, second state values ($s_j$, $s_i$) of the second sets of vertices are stored and substituted into the equation of the direct dependency relationship, so as to get the values of the parameters $\mu$, $\xi$.

In subsequent processing, after the head vertex of the path l is updated, the parameter of the direct dependency equation can be obtained using the direct dependency index. Then the impact of updating of the head vertex on the tail vertex is computed using the direct dependency equation and the state of the tail vertex is updated, without waiting for several iterations before the state of the head vertex of the path is disseminated to the tail vertex, thereby processing multiple paths on multiple processor kernels with high concurrency, and in turn accelerating dissemination of vertex states in a graph to speed convergence during graph processing.

Additionally, when the accelerator processes a dynamic graph, the direct dependency managing unit 5 updates the dependency index according to dynamic changes in graph structure, so as to ensure accurate results of graph processing.

Preferably, local circular queues are located in the memory. Local circular queues store active vertices in graph partitions corresponding to processor kernel. Every processor kernel is assigned with a graph partition for it to process, so every processor kernel has a corresponding local circular queue in the memory.

S3: Output Stage.

The pre-processing stage includes at least the following steps:

- S11: acquiring central vertices and central paths of a given graph; including steps S50-S55; and
- S12: partitioning core subgraphs, core paths, and core vertices; including step S56-S60.

Figure 4:
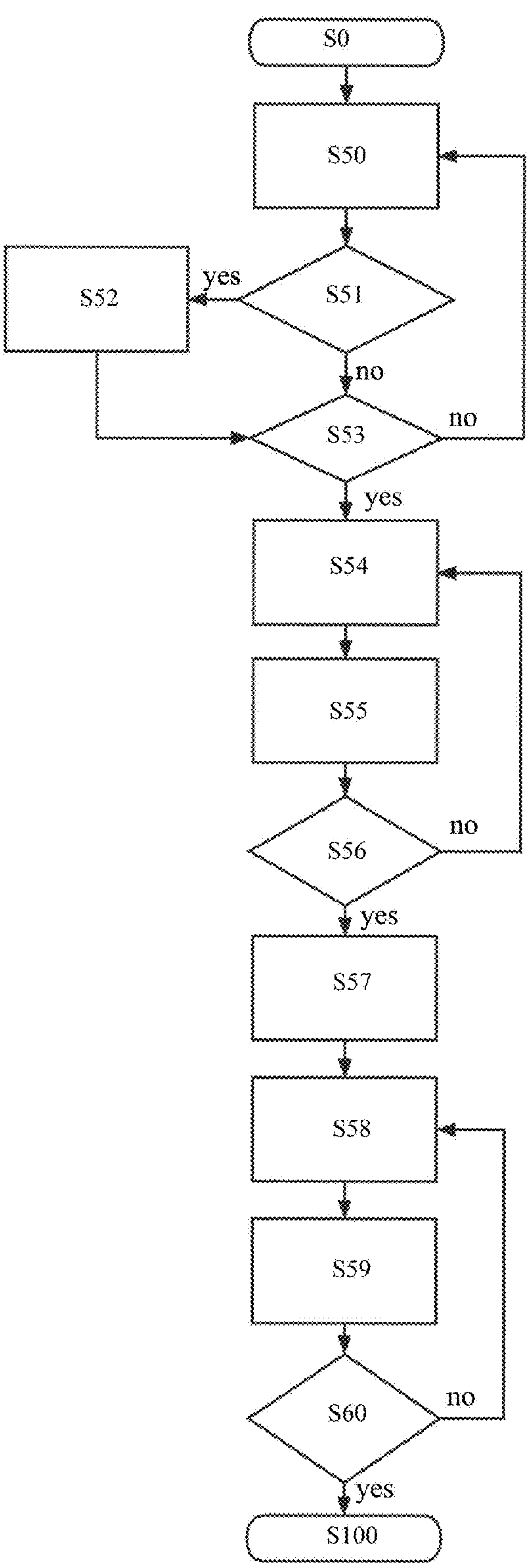
FIG. 4 is a flowchart of the pre-processing stage according to one preferred embodiment of the present invention.

The process of the pre-processing stage is specifically as shown in FIG. 4.

At S0, the process starts.

At S50, traversal is performed on graph vertices.

S51 is about determining whether the graph vertices have degrees greater than the threshold T, and if yes, executing the step S52, or if no, executing the step S53.

At S52, a central vertex set is added, and the step S54 is executed.

Specifically, the vertices having their degrees greater than the degree threshold T are identified as central vertices, and added into the central vertex set. Therein, the degree threshold T is determined by:

- according to a ratio $\lambda$ of central vertices designated by a user, computing the number $\lambda\cdot n$ of central vertices (n represents the overall number of vertices), then, according to vertex degrees, sorting all the vertices in descending order, and taking the degree of the $(\Delta\cdot n)^{th}$ vertex as the degree threshold T.

Preferably, since it could be costly to sort all the vertices, an alternative is to determine the degree threshold T simply through a sampling method, wherein the sampled vertices that take up a proportion of $\beta$ in the total vertices are sorted in descending order instead, and the degree of the $(\lambda\cdot\beta\cdot n)^{th}$ vertex is taken as the degree threshold T.

At S53, it is determined that whether traversal of the graph vertices has been completed. If yes, the process proceeds with the step S54. If no, the step S50 is executed.

S54 is about acquiring un-accessed central vertices.

Specifically, central vertices are identified from the partitioned central vertex set H.

At S55, depth-first-search traversal is performed to identify the central path.

Specifically, the central vertices are taken as the root vertices for the depth-first-search traversal. During the traversal, vertices having higher degrees are accessed precedentially, and a traversal depth is set (16 at default). Setting the head vertex of the traverse path l to be $v_{root}$, and the tail vertex to be $v_{curr}$, if $v_{curr}$ is in the central vertex set H, the path l is a central path. The vertex $v_{curr}$ is labelled as having been accessed and the path l is added into the set $G_s$. If all the vertices in the central vertex set H are labelled as having been accessed, the traversal is ended herein.

S56 involves determining whether the entire central vertex set has been accessed. If no, the step S54 is executed. If yes, the step S57 is executed.

At S57, a core subgraph is constructed.

Specifically, after completion of the current traversal, if the vertices in the central vertex set H have not all been accessed, the next un-accessed vertex in the central vertex set His selected as the root vertex and the traversal is continued until all the vertices in the central vertex set H have been accessed. The set $G_s$ of all central paths I obtained finally is the core subgraph.

S58 involves acquiring vertices that have un-accessed edges in the core subgraph.

Specifically, the vertices having un-accessed edges are identified from the core subgraph $G_s$. Therein, the central vertices are selected precedentially.

At S59, depth-first-search traversal is performed to identify a core path and its corresponding core vertices.

Starting from the vertices that have un-accessed edges, a path is identified as the depth-first-search traversal progresses. The path has a maximum length of 16 at default. All the edges along the path are labelled as accessed, and the head and tail vertices of the path are added to the core vertex set $H^m$.

S60 is about determining whether all edges in the core subgraph have been accessed. If no, the step S58 is executed. If yes, the step S100 is executed.

The foregoing steps are repeated until all the edges in the core subgraph have been accessed.

At the step S100, the process ends.

In the graph processing stage, the dependency path prefetching unit 3 of the accelerator prefetches edges along the dependency path for processing, starting with active vertices. At the same time, the direct dependency managing unit 5 converts dependency relationship between head vertex and tail vertex of a core dependency path into direct dependency relationship, and performs cache management thereon. After the value of the path's head vertex is updated, the impact of updating of the head vertex on the tail vertex is computed using the direct dependency equation and the state of the tail vertex is updated.

Figure 5:
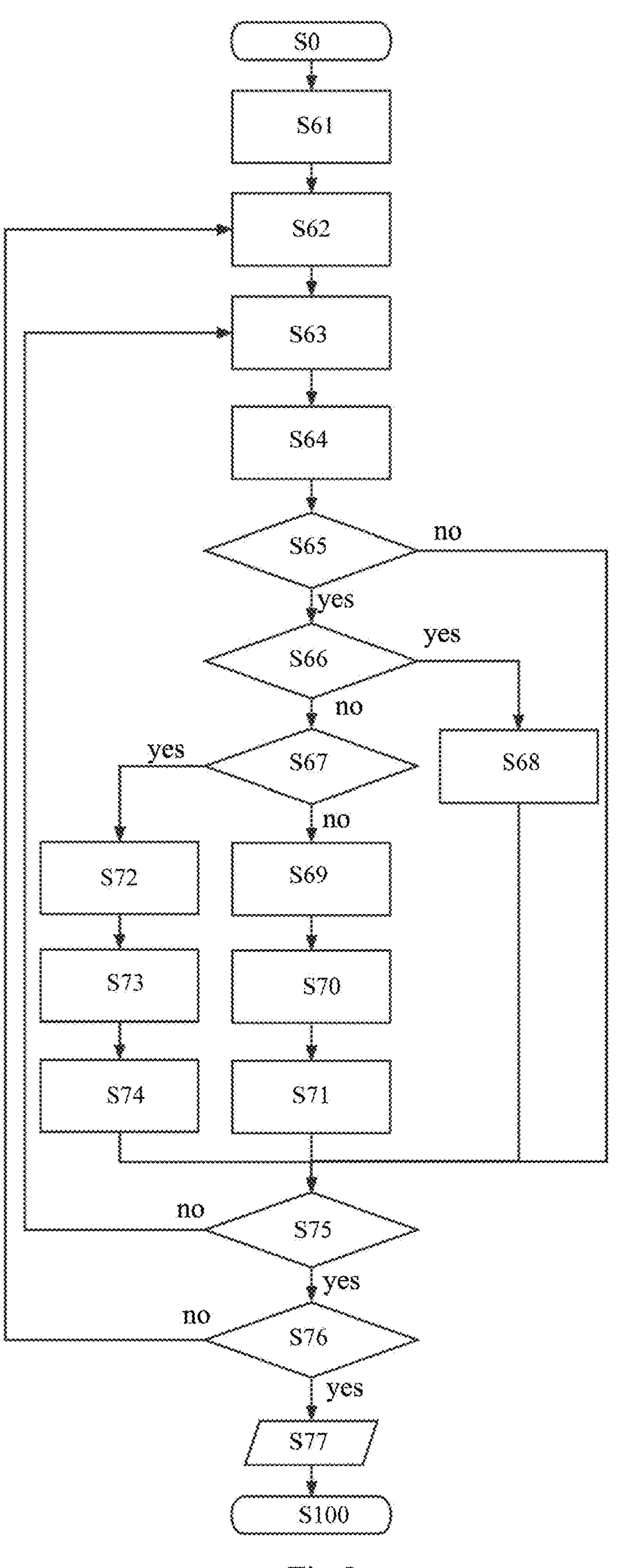
FIG. 5 is a flowchart of the processing stage according to one preferred embodiment of the present invention.

In the present invention, the process of the graph processing stage is specifically as shown in FIG. 5.

At S0, the process starts.

S61: accelerator initialization.

Specifically, by calling and using the configuration interface of the accelerator, the graph data information in the graph data 9 is transmitted to a memory mapped register accessible to the accelerator to initialize the accelerator. The process of initialization of the accelerator is about sending the graph data information (e.g., the CSR array head address, etc.) but not the graph data itself to the accelerator. The graph data information is transmitted in the path of the memory—the third cache unit 8—the second cache unit 6—the memory mapped register of the accelerator.

The graph data information at least include:

(a) the addresses and the sizes of the offset array, the edge array, and the vertex state array contained in the CSR-format graph data;

(b) the ID of start and end vertex in the graph partition which is assigned to the corresponding processor kernel;

(c) the size and the head address of the core vertex set $H^m$ in the graph partition $G^m$; and (d) the address and the sizes of active vertices queue corresponding to the processor kernel, wherein the active vertices queue (local circular queue) is used to store the active vertices in the graph partition $G^m$ that are to be processed.

S62 is about acquiring active vertices from the local circular queue.

S63 involves acquiring graph data along the dependency path of the active vertices.

Specifically, the dependency path prefetching unit 3 dynamically prefetches edges in the graph partition $G^m$ corresponding to the processor kernel 1 by means of depth-first search.

The dependency path prefetching unit 3 uses a stack having a fixed depth to record the prefetched information. The following details are included in each stack entry:

(a) IDs of the vertices accessed during the traversal;

(b) the begin offsets and end offsets of the un-accessed vertices' edges;

(c) IDs of the un-accessed vertices neighboring the vertices.

Specifically, the dependency path prefetching unit 3 prefetches the edges in a manner of a 4-stage pipeline. Every acquired edge and the sate of a pair of vertices corresponding to the edge are output to the FIFO edge buffer area for the processor kernel 1 to access and process.

At S63.1, acquiring a vertex from active vertex queue, and pushing it into the empty stack.

At S63.2, the starting/ending offsets of the outgoing edge of the stack top vertex are acquired from the offset array.

At S63.3, according to un-accessed edges of the vertices, IDs of un-accessed neighbor vertices are acquired, and one of the neighbor vertices is pushed into the stack.

At S63.4, the edge and the values of two vertices corresponding to the edge are output to the First-Input-First-Output edge buffer area. If the stack top vertex is in the vertex set $H^m$, the stack top vertex is popped and push to the active vertex queue. Then the process enters the step S63.1. If no un-accessed vertex in the graph partition $G^m$ is acquired from the neighbors of the stack top vertex, the stack top vertex is popped and the process enters the step S63.1.

At S64, graph data are processed.

For example, the graph data are processed using a graph algorithm. The graph algorithm may be, for example, an SSSP algorithm.

S65 involves determining whether there is any direct dependency index. If yes, the step S66 is executed. If no, the step S75 is executed.

Specifically, while the dependency path prefetching unit 3 prefetches edges, the direct dependency managing unit 5 converts indirect dependency between the head vertex and tail vertex of the core dependency path into direct dependency.

When the dependency relationship between the vertices is linear, the direct dependency relationship between the two vertices may be represented by the equation: $s_i=f_{(v_j,v_i)}(s_j)=\mu\cdot s_j+\xi$, where $s_j$, $s_i$ are the state values of the vertices j, i, and u, $\xi$ are constant parameters. In the SSSP algorithm, the parameter $\mu$ is always 1.

The direct dependency managing unit 5 stores the direct dependency index between head vertex and tail vertex of the path using a direct dependency index array. As shown in FIG. 1, every index in the array comprises a head vertex serial number j, a tail vertex serial number i, a path label l, a parameter u, a parameter $\xi$, and an index label flag. Therein, the index label flag represents the current state of the index, which may be one of the three situations:

(a) if the index label is N, the index is invalid;

(b) if the index label is I, the current values of the parameters $\mu$, $\xi$ are the set of the state values $s_j$, $s_i$ of the vertices j, i; and (c) if the index label is A, the index is valid, and the value of the parameters $\mu$, $\xi$ are the values of the parameters of the direct dependency equation.

S66 is about determining whether the state of the direct dependency index is A; and if yes, executing the step S68; or if no, executing the step S67.

S67 is about determining whether the state of the direct dependency index is I; and if no, executing the step S69; or if yes, executing the step S72.

At S68, the impact of the head vertex of the path on the tail vertex is computed using direct dependency, and the process proceeds with the step S75.

S69 involves processing the core dependency path.

S70 is about storing the state values of the head and tail vertices of the path to the index.

At S71, the state of the direct dependency index is set as I, and the process proceeds with the step S75.

S72 is for processing the core dependency path.

At S73, the constant parameters of the direct dependency equation are computed.

At S74, the state of the direct dependency index is set as A.

S75 is about determining whether prefetching along the current dependency path has been completed; and if yes, executing the step S76; or if no, executing the step S63.

S76 involves determining whether the local circular queue is empty; and if yes, executing the step S77; or if no, executing the step S62.

S77 outputs the results.

At S100, the process ends.

The conversion of dependency is carried through the steps S69-S74.

Specifically, an example of step S69-S71 is as below.

The index label flag of the direct dependency index is initialized as N. During graph processing, after completion of the first processing of the core dependency path l (i.e., a path whose head and tail vertices are both in the vertex set $H'''$), the serial numbers j, i and the first state values $s_j$, $s_i$ of its head and tail vertices are stored into the direct dependency index array, and the index label flag is set as I.

Specifically, an example of the steps S72-S74 is: after completion of the second processing of the path l, a set of second state values $s_j$, $s_i$ associated with the head and tail vertices is obtained and substituted together with the first state values $s_j$, $s_i$ that have been stored at the indexes μ, ξ into the equation of direct dependency relationship, namely $f_{(v_j,v_i)}(s_j)=\mu\cdot s_j+\xi$, so as to obtain the values of the constant parameters μ, ξ, the values of the constant parameters μ, ξ will be stored at index. The index label flag is set as A.

When the dependency path prefetching unit 3 prefetches the head vertex of the path, the direct dependency managing unit 5 searches for the corresponding dependency index using the vertex ID, and then the dependency index information is acquired and provided to the processor kernel. The processor kernel determines the impact of the head vertex of the path on the tail vertex through computing according to the dependency index information (the parameter μ, and the parameter ξ) and updates the tail vertex' value. Afterward, the tail vertex of the path is push to the active vertex queue in the processor kernel.

Embodiment 2

This embodiment is a further improvement of Embodiment 1, and will not make repeated description.

Preferably, as shown in FIG. 1, the graph processing accelerator further comprises an on-chip cache unit 4. The on-chip cache unit 4 may be a sub-processor, an application-specific integrated chip, or a server having functions of an on-chip cache. For example, it is a sub-processor capable of executing an encoding program of on-chip caching. The on-chip cache unit 4 and the direct dependency managing unit 5 are in relationship of data transmission.

The on-chip cache unit 4 and the direct dependency managing unit 5 are in connection for data transmission and data storage. The on-chip cache unit 4 is used to store table entries of an in-memory hash table. The in-memory hash table is for the direct dependency managing unit 5 to fast identify dependency indexes, so the on-chip cache unit 4 and the direct dependency managing unit are in relationship of data transmission.

Preferably, with the on-chip cache unit 4 in the graph processing accelerator, for accelerating search of the dependency index, the direct dependency managing unit 5 uses an in-memory hash table to fast acquire storage addresses of target dependency indexes, and uses the on-chip cache unit 4 to cache frequently accessed entries and entries having collisions of the hash table.

The process is detailed below.

The mapping relationship between vertex IDs and direct dependency index addresses is established by means of an in-memory hash table.

Every entry in the in-memory hash table may be represented as <ID, start_offset, end_offset, weight>. Therein, start_offset and end_offset represent the start offset and the end offset of the dependency index in the direct dependency index array corresponding to the vertex ID, respectively. The weight represents the weight value of the table entry. The weight is set as |M+N|, where M is the number of the dependency indexes corresponding to the vertex ID, N is the number of hash collisions happening when the hash table entries are inserted. The number of the entries in the in-memory hash table is set as |H|/d, where |H| is the core vertices' amount. Preferably, d is set as ¾. The collisions are dealt with linear probing.

When the direct dependency managing unit 5 converts dependency relationship, insertion or updating is made to the in-memory hash table according to the generated direct dependency indexes.

Insertion or updating made to the in-memory hash table according to the generated direct dependency indexes may be any of at least the following situations.

The first case: if the vertex ID corresponding to the direct dependency index has not been inserted into the in-memory hash table, the direct dependency managing unit 5 inserts the table entry <ID, start_offset, end_offset, weight> into the in-memory hash table, wherein the weight is set as the number of hash collisions N+1.

The second case: if vertex ID corresponding to the direct dependency index has been inserted into in-memory hash table, the direct dependency managing unit 5 updates the start offset start_offset, the end offset end_offset and the weight of the table entry, wherein the weight is updated to weight+1.

When the direct dependency managing unit 5 searches dependency indexes, it first acquires the corresponding start offset and end offset (start_offset and end_offset) from the hash table according to the vertex IDs, and then identifies the direct dependency index information corresponding to vertices from the direct dependency index array according to the offsets.

The direct dependency managing unit 5 caches table entries that are frequently accessed or table entries with collision of the in-memory hash table to the on-chip cache unit 4, thereby further accelerating search for dependency indexes.

Particularly, the direct dependency managing unit 5 establishes a cache hash table in the on-chip cache unit 4, and employs a custom insertion strategy and a replacement strategy to cache hash table entries into the cache hash table.

Insertion strategy: if the space in the on-chip cache unit is not full and the accessed hash table entry has not been cached, the hash table entry is inserted into the on-chip cache unit.

Replacement strategy: if the space of the on-chip cache unit is full and the accessed hash table entry has not been cached, the hash table entry having the lowest weight among all the entries in the on-chip cache unit is replaced and removed from the cache space.

When the direct dependency managing unit 5 identifies the hash table entries according to the vertex IDs, it starts from the on-chip cache unit and if no entry is identified, search proceeds with the in-memory hash table. A custom cache strategy is used to cache the identified hash table entries.

Preferably, in order to get the direct dependency index, the direct dependency managing unit 5 employs a custom cache strategy to cache the direct dependency index in to the cache of the multi-core processor. The process may be specifically carried through the following parts.

Partitioning of dependency indexes by reusability: all the dependency indexes are sorted in descending order according to the degrees of the dependency source vertices. A one-LLC area at the top of the sorted list is defined as the high reuse region, and a one-LLC area immediately following the high reuse region is defined as the medium reuse region, while the remaining part is defined as the low reuse region. The dependency indexes in every region have a corresponding level of reusability.

Insertion strategy: if an accessed dependency index has not been cached, the index is inserted into the cache and is assigned with corresponding caching priority according to its reuse level. Otherwise, the index is not inserted. An index in the high reuse region is assigned to be of high priority. An index in the medium reuse region is assigned to be of medium priority. Index and graph data in the low reuse region are assigned to be of low priority.

Hit ratio enhancement strategy: when a dependency index is hit, its caching priority is increased. Particularly, a hit index in the high reuse region is directly promoted to be of top priority, and a hit index in the medium or low reuse region is promoted by only one level.

Expelling strategy: when the cache space is full, the dependency index or graph data having the least priority in terms of caching is replaced and removed from the cache first, and a dependency index having not been hit for long is gradually devalued in terms of priority.

Embodiment 3

This embodiment is a further improvement of Embodiment 1, and will not make repeated description.

The direct dependency managing unit 5 is further configured to: during dynamic graph processing, update dependency indexes according to changes in graph structure.

The dependency indexes that have become invalid are identified according to changes in graph structure, and deleted by the direct dependency managing unit.

Figure 3:
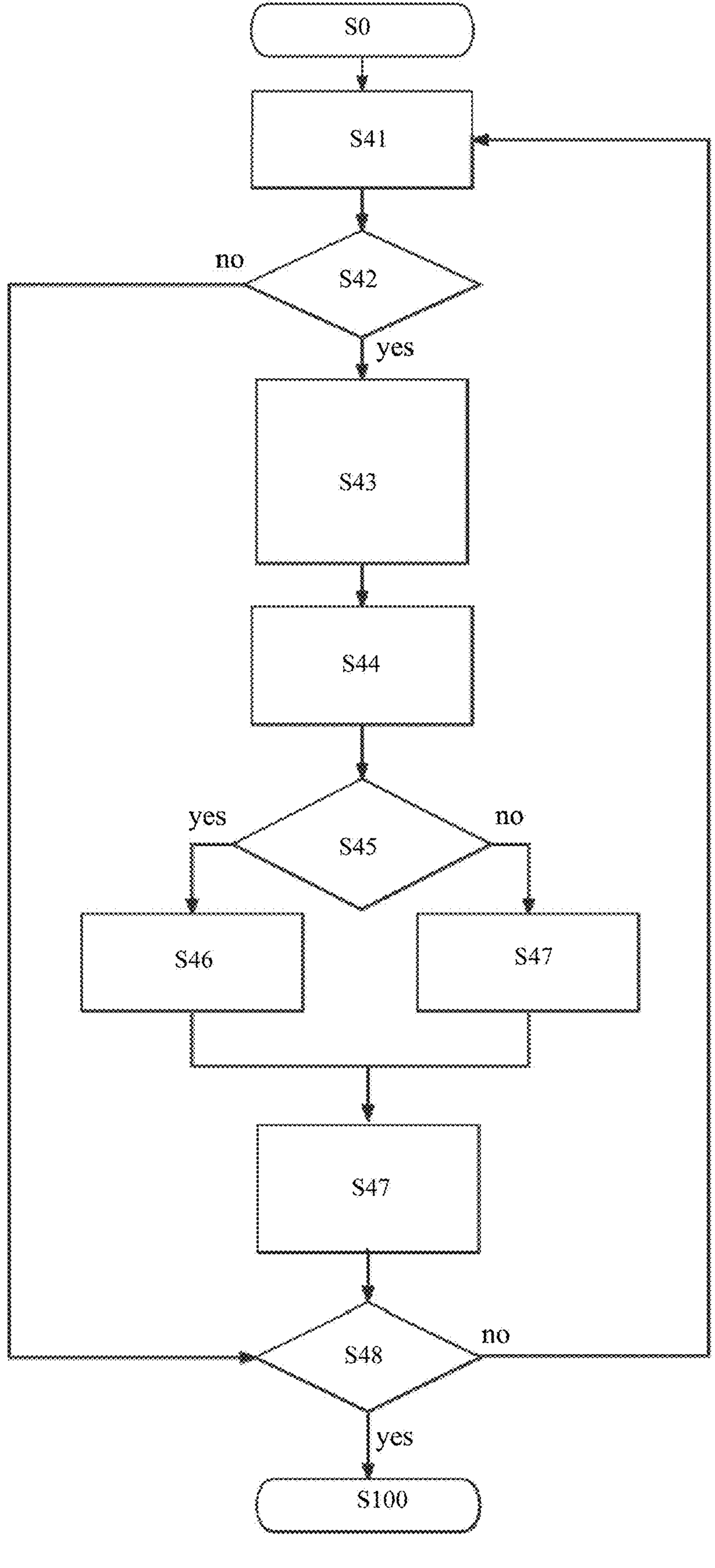
FIG. 3 is a flowchart of dependency index updating in graph processing according to one preferred embodiment of the present invention.

The process specifically comprises the steps as shown in FIG. 3 and detailed below.

At S41, traversal is performed on graph structure updating information to identify a deleted edge <s, d>.

S42 is about determining whether the deleted edge is in the core subgraph; and if yes, executing the step S43; or if no, executing the step S48.

At S43, if the deleted edge is in the core subgraph, depth-first-search traversal is performed on the core subgraph, starting from the target vertex d of the deleted edge, and a maximum traversal depth is set (to be the same as the traversal depth for the graph data pre-processing stage). The core vertices accessed in the traversal are added into the vertex set $H^d$ If the target vertex d is a core vertex, it is added to the vertex set. After traversal, the vertex set $H^d$ is transmitted to the direct dependency managing unit for index updating.

At S44, the direct dependency managing unit 5 performs traversal to identify a direct dependency index whose tail vertex serial number is in the vertex set $H^d$.

S45 is about determining whether the head vertex of the dependency index is in the vertex set $H^d$; and if yes, executing the step S46, if no, executing the step S47.

At S46, if the head vertex of the dependency index is in the vertex set $H^d$, the dependency index is retained.

At S47, if the head vertex of the dependency index is not in the vertex set $H^d$, the dependency index is deleted.

At S48, the core subgraph is updated synchronously by deleting the corresponding edges from the core subgraph, and adding the source vertex and the target vertex of each deleted edge into the core vertex set $H^m$. Then it is determined whether traversal of the graph structure updating information has been completed. If yes, the process proceeds with the step S100. If no, the process returns to the step S41.

At S100, if traversal of the graph structure updating information has been completed, the current dependency index updating stage is completed and the process ends.

In a specific embodiment, a processor loaded with the disclosed method of the present invention is installed in a high capacity server host, to provide services for upper-layer graph computing applications, such as applications for social network analysis, commodity recommendation, path prediction, financial fraud detection.

Taking a social network analysis application as an example, graph data are constituted by social relationships between users, in which vertices represent users, edges represent user interactions such as "follow", "like". Application functions including friend recommendation, content recommendation can be realized by executing graph analysis algorithms like SSSP, BFS, WCC on social graph data.

A processor loaded with the disclosed method of the present invention can accelerate execution of graph algorithms. During execution of the graph algorithms, values of vertices will be transferred along the edges, and transfer paths of vertex values composed of one or more edges constitute dependency relations between vertices.

A processor loaded with the disclosed method of the present invention processes data of graph structures, which are constituted by vertices and edges. For example, social network, commodity transaction network would generate graph data, which are stored in a disk, the processor loads graph data in the disk into a memory and then processes the graph data in the memory.

After being processed by the processor loaded with the disclosed method of the present invention, corresponding graph algorithm result data would be generated in the memory, which could be read by upper-layer applications. Upper applications would execute different operations according to the result to realize different specific functions, such as social analysis, commodity recommendation, path prediction, financial fraud detection and so on.

The processor performs data processing in the memory. After processing, result data of the graph algorithms are generated in the memory for use by upper-layer graph computing applications. The generated result data of graph algorithms can also be written into result files in a disk for long-term storage.

It should be noted that the above-mentioned specific embodiments are exemplary, and those skilled in the art can come up with various solutions inspired by the disclosure of the present invention, and those solutions also fall within the disclosure scope as well as the protection scope of the present invention. It should be understood by those skilled in the art that the description of the present invention and the accompanying drawings are illustrative rather than limiting to the claims. The protection scope of the present invention is defined by the claims and their equivalents. The description of the present invention contains a number of inventive concepts, such as "preferably", "according to a preferred embodiment" or "optionally", and they all indicate that the corresponding paragraph discloses an independent idea, and the applicant reserves the right to file a divisional application based on each of the inventive concepts.

What is claimed is:

1. An energy-efficient collaborative apparatus for graph processing, comprising:

a graph processing accelerator coupled to a processor kernel, wherein the graph processing accelerator comprises:

a dependency path prefetching module configured to receive active vertex information and prefetching an edge of graph partition along a dependency path, starting with an active vertex in a circular queue; and a direct dependency managing module configured to convert dependency relationship between head and tail vertices of a core dependency path into direct dependency, wherein the direct dependency managing module is further configured to:

use a direct dependency index array to store direct dependency indexes between the head and tail vertices of the core dependency path; and update, during dynamic graph processing, dependency indexes according to dynamic changes in graph structure, and wherein in each iteration, the graph processing accelerator is configured to:

prefetch graph data along the dependency path for the processor kernel to access and process, so that the graph vertex's value is able to be efficiently disseminated on the dependency path, and maintain a set of direct dependency relationship between the head and tail vertices of the core dependency path, thereby further accelerating dissemination of vertex states, and maximizing parallelism of a multi-core processor.

2. The energy-efficient collaborative apparatus for graph processing of claim 1, wherein the direct dependency managing module is further configured to:

during the dynamic graph processing, acquire an invalid dependency index based on changes in a graph structure, and delete the invalid dependency index so as to achieve updating of the dependency indexes.

3. The energy-efficient collaborative apparatus for graph processing of claim 2, wherein the dependency path prefetching module is further configured to prefetch, starting with the active vertex, the edge of the graph partition along the dependency path at least through:

with an accelerator initialized, prefetching the edge by means of a 4-stage pipeline, and outputting the identified edge and a state of a pair of vertices corresponding to the edge to a FIFO edge buffer area for a processor kernel to access and process.

4. The energy-efficient collaborative apparatus for graph processing of claim 3, wherein the dependency path prefetching module prefetches the edge by means of the 4-stage pipeline at least through:

acquiring a vertex from active vertex queue, and pushing it into the empty stack;

acquiring start/end offsets of an outgoing edge of a stack top vertex from an offset array;

according to edges not accessed of the stack top vertex, identifying IDs of neighbor vertices not accessed, and pushing one of the neighbor vertices into the stack; and outputting the edge and the values of two vertices corresponding to the edge to First-Input-First-Output buffer area; and if the stack top vertex is in a vertex set $H^m$, popping the stack top vertex from the stack, and inserting it to the circular queue as a new active vertex; or if there are not any un-accessed vertices in the graph partition $G^m$ identified from the neighbor vertices of the stack top vertex, popping the stack top vertex from the stack.

5. The energy-efficient collaborative apparatus for graph processing of claim 4, wherein the direct dependency managing module converts the dependency relationship between the head and tail vertices of the core dependency path into the direct dependency using an equation at least as:

$$s_i = f_{(v_j,v_i)}(s_j) = \mu \cdot s_j + \xi,$$

where $s_j$ and $s_i$ are state values of the vertices j, i, and μ, ξ denote constant parameters.

6. The energy-efficient collaborative apparatus for graph processing of claim 5, wherein the direct dependency managing module converts the dependency relationship between the head and tail vertices of the core dependency path into the direct dependency at least through:

after first processing of the core dependency path l, storing serial numbers j, i and first state values $s_j$, $s_i$ of its head and tail vertices to the direct dependency index array, and setting an index flag as I, wherein the core dependency path is a path having its head and tail vertices both in the vertex set $H^m$;

after second processing of the core dependency path l, acquiring second $$s'_j, s'_i$$

of the head and tail vertices, and substituting the second state values $$s'_j, s'_i$$

and the first state values $s_j$, $s_i$ into the equation of direct dependency to calculate values of the constant parameters μ, ξ and storing the values of the constant parameters μ, ξ into the direct dependency index array, and setting the index flag as A.

7. The energy-efficient collaborative apparatus for graph processing of claim 6, further comprising an on-chip cache unit, in which the on-chip cache unit is in data connection with the direct dependency managing module, and the direct dependency managing module establishes mapping relationship between vertex IDs and direct dependency index addresses through an in-memory hash table, and a cache hash table is established in the on-chip cache unit, wherein the direct dependency managing module caches frequently accessed table entries and table entries with collision of the in-memory hash table into the on-chip cache unit according to a custom insertion strategy and/or replacement strategy.

8. The energy-efficient collaborative apparatus for graph processing of claim 7, wherein when the head vertex of the path is prefetched, the direct dependency managing module searches a corresponding dependency index by the vertex IDs at least through:

acquiring a storage address of a target dependency index from the on-chip cache unit, and if acquisition fails, acquiring a storage address of the target dependency index from the in-memory hash table; and according to the storage address of the target dependency index, acquiring direct dependency index information corresponding to vertices from the direct dependency index array.

9. The energy-efficient collaborative apparatus for graph processing of claim 8, wherein during the process of dynamic graph processing, the direct dependency managing module updates the dependency indexes at least through:

traversing graph structure updating information, and acquiring a deleted edge <s, d>, performing depth-first-search traversal in a core subgraph starting from a target vertex d of the deleted edge, and setting a maximum traversal depth;

adding core vertices accessed during the traversal into the vertex set $H^d$, and transferring the vertex set $H^d$ to the direct dependency managing module after the traversal for index updating;

performing traversal to identify the direct dependency index whose tail vertex has a serial number in the vertex set $H^d$ by the direct dependency managing module, and if the head vertex of the dependency index is not in the vertex set $H^d$, deleting the dependency index, or if the head vertex of the dependency index is in the vertex set $H^d$, retaining the dependency index; and updating the core subgraph synchronously by deleting the corresponding edge from the core subgraph, and adding a source vertex and a target vertex of the deleted edge to the core vertex set $H^m$.

10. A energy-efficient collaborative method for graph processing, comprising at least:

receiving, at a graph processing accelerator, active vertex information and prefetching an edge of graph partition along a dependency path, starting with an active vertex in a circular queue; and converting dependency relationship between head and tail vertices of a core dependency path into direct dependency;

storing, using a direct dependency index array, direct dependency indexes between the head and tail vertices of the core dependency path; and updating dependency indexes according to dynamic changes in graph structure during dynamic graph processing, so as to ensure accurate results of graph processing, wherein in each iteration, the graph processing accelerator is configured to:

prefetch graph data along the dependency path for the processor kernel to access and process, so that the graph vertex's value is able to be efficiently disseminated on the dependency path, and maintain a set of direct dependency relationship between head vertex and tail vertex of the core dependency path, thereby further accelerating dissemination of vertex states, and maximizing parallelism of the multi-core processor.

11. The energy-efficient collaborative method for graph processing of claim 10, wherein the method further comprises:

during the dynamic graph processing, acquiring an invalid dependency index based on changes in a graph structure, and delete the invalid dependency index so as to achieve updating of dependency indexes.

12. The energy-efficient collaborative method for graph processing of claim 11, wherein the step of prefetching an edge of graph partition along a dependency path, starting with an active vertex in a circular queue comprises:

with an accelerator initialized, prefetching the edge by means of a 4-stage pipeline, and outputting the identified edge and a state of a pair of vertices corresponding to the edge to a FIFO edge buffer area for a processor kernel to access and process.

13. The energy-efficient collaborative method for graph processing of claim 12, wherein the step of prefetching the edge by means of a 4-stage pipeline at least includes:

acquiring a vertex from active vertex queue, and pushing it into the empty stack;

acquiring start/end offsets of an outgoing edge of a stack top vertex from an offset array;

according to edges not accessed of the stack top vertex, identifying IDs of neighbor vertices not accessed, and pushing one of the neighbor vertices into the stack; and outputting the edge and the values of two vertices corresponding to the edge to First-Input-First-Output buffer area; and if the stack top vertex is in a vertex set $H^m$, popping the stack top vertex from the stack, and inserting it to the circular queue as a new active vertex; or if there are not any un-accessed vertices in the graph partition $G^m$ identified from the neighbor vertices of the stack top vertex, popping the stack top vertex from the stack.

14. The energy-efficient collaborative method for graph processing of claim 13, wherein the step of converting dependency relationship between head and tail vertices of a core dependency path into direct dependency is performed by using an equation at least as:

$$s_i = f_{(v_j,v_i)}(s_j) = \mu \cdot s_j + \xi,$$

where $s_j$ and $s_i$ are state values of the vertices j, i, and u, ξ denote constant parameters.

15. The energy-efficient collaborative method for graph processing of claim 14, wherein the step of converting dependency relationship between head and tail vertices of a core dependency path into direct dependency at least comprises:

after first processing of the core dependency path l, storing serial numbers j, i and first state values $s_j$, $s_i$ of its head and tail vertices to the direct dependency index array, and setting an index flag as l, wherein the core dependency path I is a path having its head and tail vertices both in the vertex set $H^m$;

after second processing of the core dependency path l, acquiring second state values $$s'_j, s'_i$$

of the head and tail vertices, and substituting the second state values $$s'_j, s'_i$$

and the first state values $s_1$, $s_i$ into the equation of direct dependency to calculate values of the constant parameters μ, ξ, and storing the values of the constant parameters μ, ξ into the direct dependency index array, and setting the index flag as A.

16. The energy-efficient collaborative method for graph processing of claim 15, wherein the method further comprises:

establishing mapping relationship between vertex IDs and direct dependency index addresses through an in-memory hash table, and establishing a cache hash table, caching frequently accessed table entries and table entries with collision of the in-memory hash table according to a custom insertion strategy and/or replacement strategy.

17. The energy-efficient collaborative method for graph processing of claim 16, wherein the method further comprises:

when the head vertex of the path is prefetched, searching a corresponding dependency index by the vertex IDs, which at least comprises:

acquiring a storage address of a target dependency index from the on-chip cache unit, and if acquisition fails, acquiring a storage address of the target dependency index from the in-memory hash table; and according to the storage address of the target dependency index, acquiring direct dependency index information corresponding to vertices from the direct dependency index array.

18. The energy-efficient collaborative method for graph processing of claim 17, wherein the method further comprises:

during the process of dynamic graph processing, updating the dependency indexes at least through:

traversing graph structure updating information, and acquiring a deleted edge <s, d>;

performing depth-first-search traversal in a core subgraph starting from a target vertex d of the deleted edge, and setting a maximum traversal depth;

adding core vertices accessed during the traversal into the vertex set $H^d$, and transferring the vertex set $H^d$ to the direct dependency managing unit after the traversal for index updating;

performing traversal to identify the direct dependency index whose tail vertex has a serial number in the vertex set 1-1" by the direct dependency managing unit, and if the head vertex of the dependency index is not in the vertex set $H^d$, deleting the dependency index, or if the head vertex of the dependency index is in the vertex set $H^d$, retaining the dependency index; and updating the core subgraph synchronously by deleting the corresponding edge from the core subgraph, and adding a source vertex and a target vertex of the deleted edge to the core vertex set $H^m$.

* * * * *